UNITED STATES PATENT OFFICE.

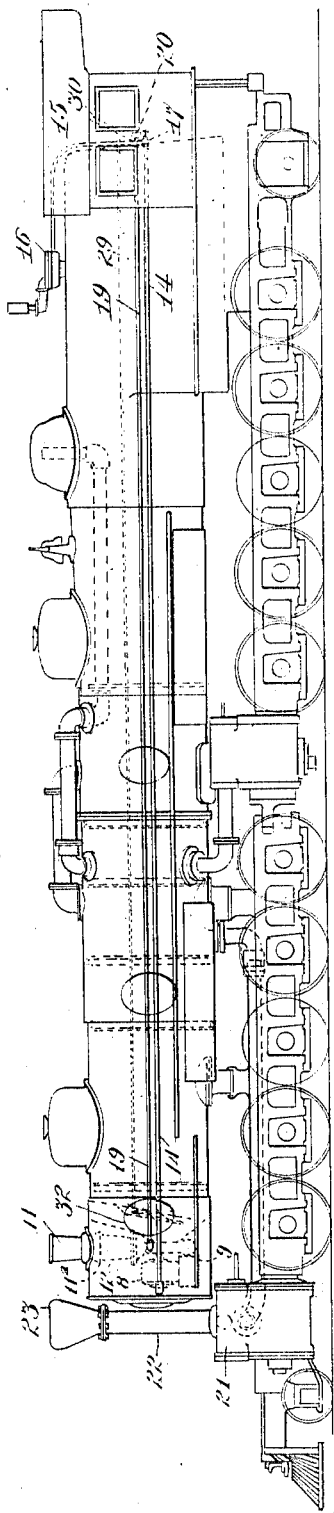

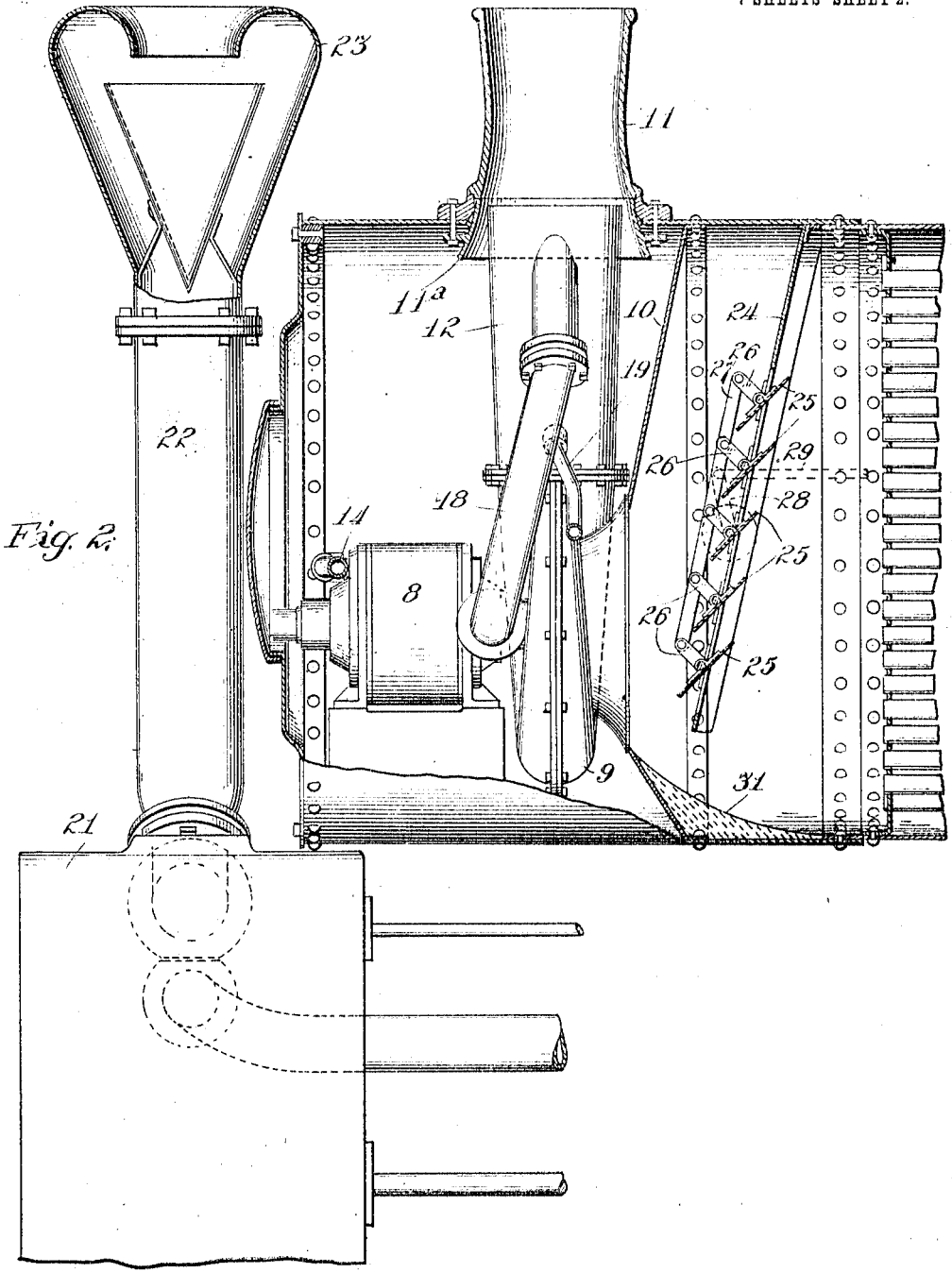

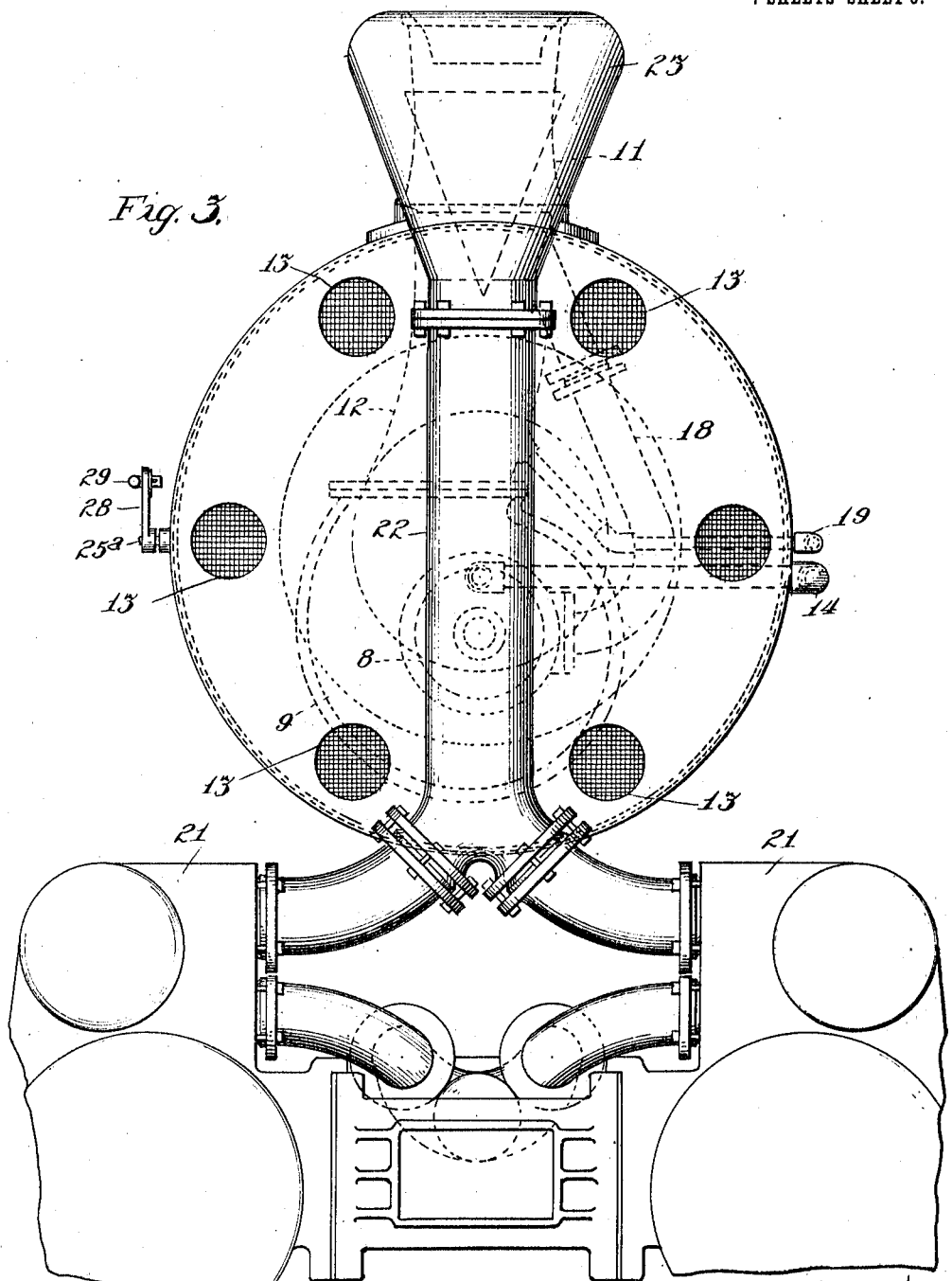

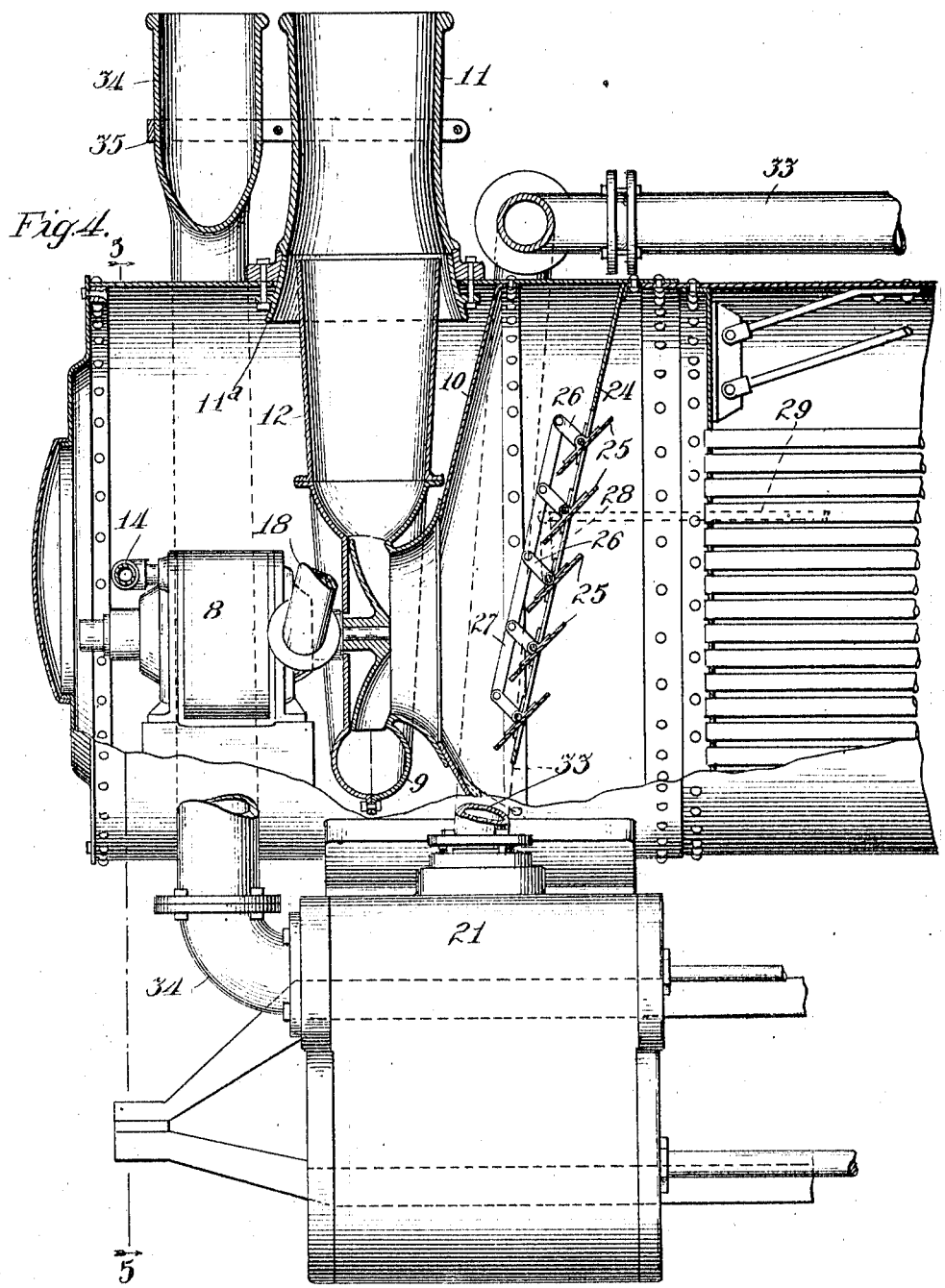

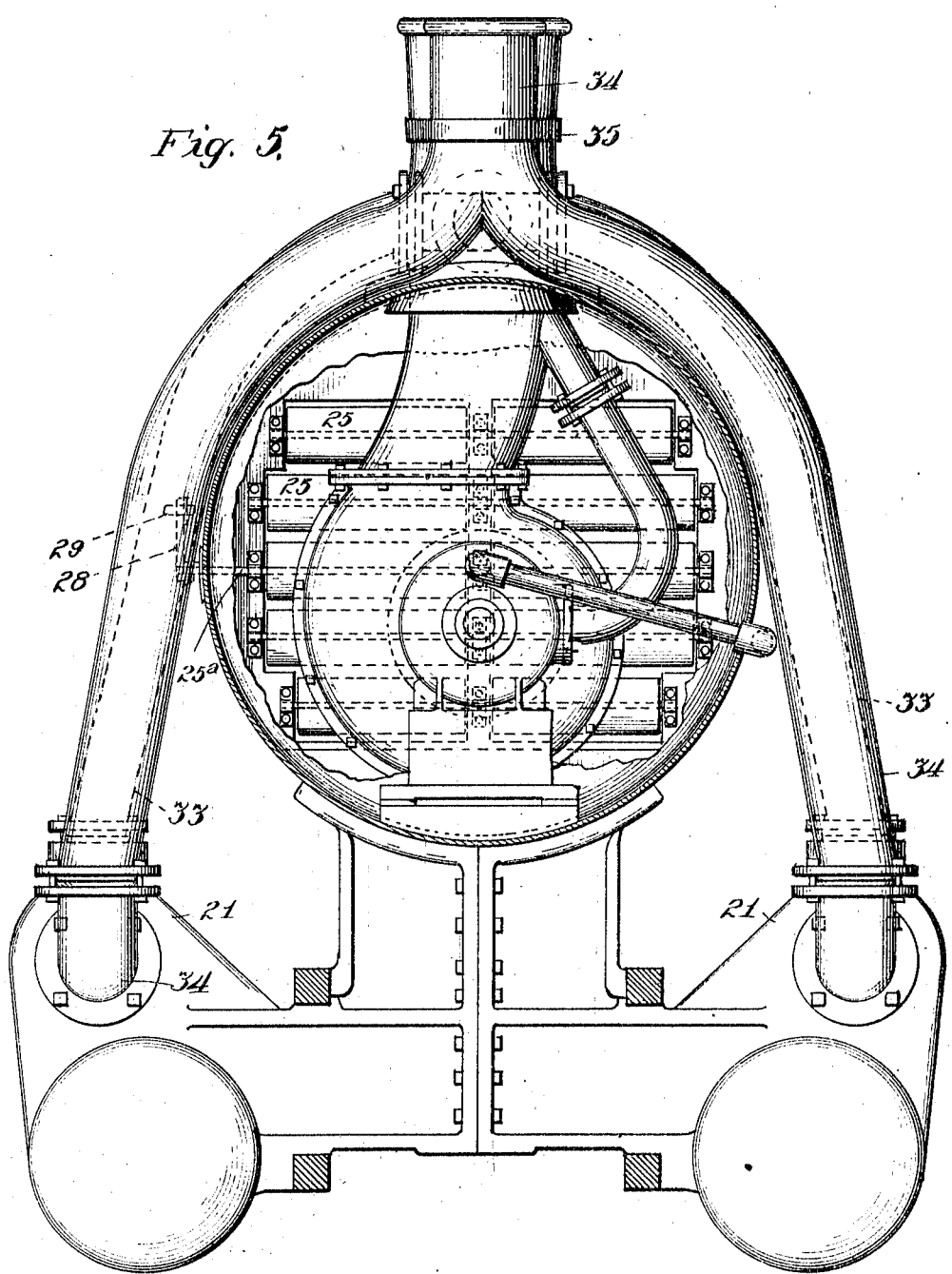

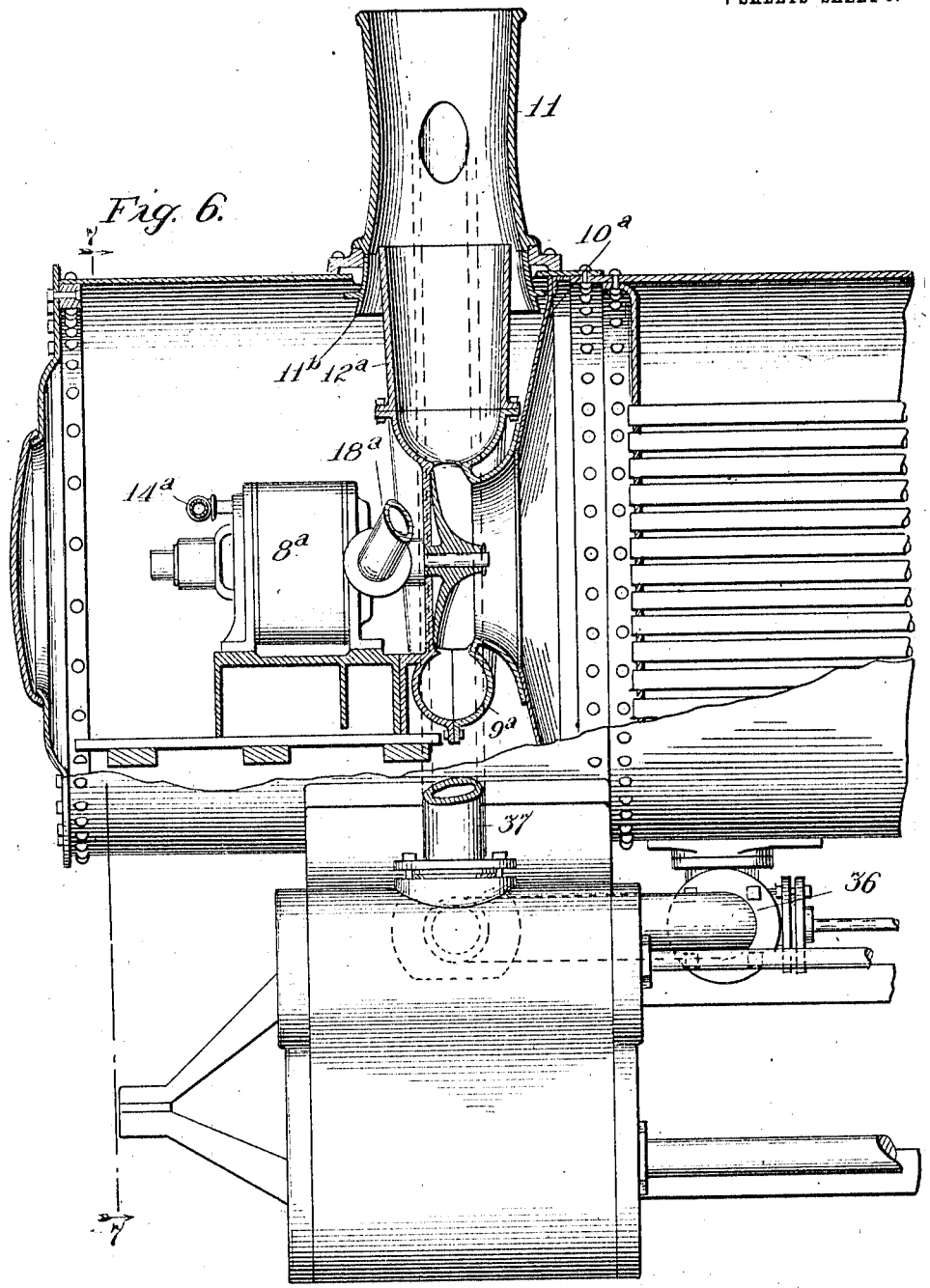

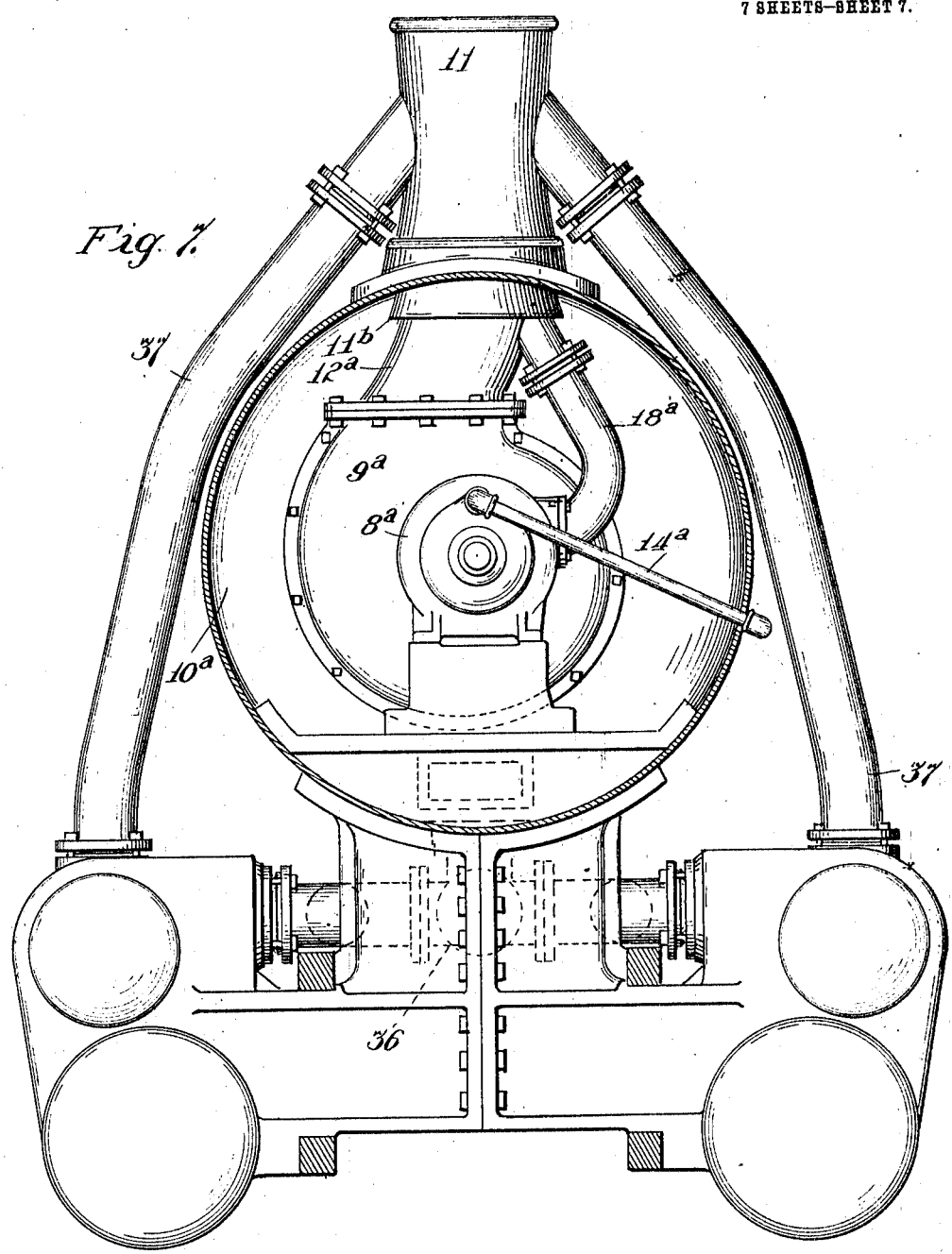

HELON B. MacFARLAND, OF TOPEKA, KANSAS.

LOCOMOTIVE.

1,059,378.  Specification of Letters Patent.  Patented Apr. 22, 1913.

Application filed September 14, 1912. Serial No. 720,411.

*To all whom it may concern:*

Be it known that I, HELON B. MACFARLAND, a citizen of the United States, and resident of Topeka, in the county of Shawnee and State of Kansas, have invented certain new and useful Improvements in Locomotives, of which the following is a description, reference being had to the accompanying drawings.

My invention relates more especially to the provision of means for inducing and controlling the draft in a locomotive whereby the gases of combustion are caused to flow forward from the fire-box through the fire tubes or flues.

The invention also has for its object the provision of unrestricted passages for the steam exhausting from the cylinders, whereby the steam is permitted to escape into the atmosphere in such a manner that the back pressure on the exhaust steam will be reduced to a minimum. The system resulting from the application of my invention—wherein draft for the gases of combustion is mechanically induced, together with the manner of conducting the steam to and from the cylinders of the locomotive—produces a power plant of greater efficiency and with greater economy in both water and fuel than is the case with the constructions heretofore employed.

Another object of my invention is the provision and arrangement of the steam passages to and from the steam-cylinders of the locomotive in the most direct manner possible and thereby avoid the bends and restrictions necessary in the constructions heretofore employed; all the steam pipe connections or joints in my improved construction being arranged or located to the exterior of the boiler-shell where they are accessible and may be readily inspected and repaired without the necessity of dismantling any part of the locomotive or boiler.

In the application of my invention to a Mallet compound locomotive, the exhaust steam pipes are led direct from the valve chambers of the low pressure locomotive cylinders into the atmosphere without conducting them through the smoke-box of the boiler as has heretofore been necessary for the purpose of producing the requisite draft for the gases of combustion.

Another object of my invention is the provision of cylinder castings wherein the steam passages are eliminated as far as practicable, thus resulting in cylinder castings of greater simplicity and strength than is true with those at present employed. The principal features of my invention, however, may be applied to any type of locomotive without requiring new cylinder castings, the steam pipes that lead to and from the cylinder being applied in any suitable manner, as will be readily understood from the following detailed description.

In the drawings—Figure 1 is a side elevation of a Mallet compound locomotive provided with my invention. Fig. 2 is an enlarged view of the front or smoke-box end of the locomotive shown in Fig. 1; a portion of the mechanism as well as the front or smoke-box end of the locomotive being shown in section, to more clearly illustrate the application of my invention. Fig. 3 is a front end elevation of the construction shown in Fig. 2. Fig. 4 is a partial side and longitudinal sectional view of the front end of a locomotive, illustrating the details of a modified form of my invention. Fig. 5 is a vertical sectional view taken on the line 5—5 of Fig. 4, looking in the direction of the arrow. Fig. 6 is a partial side and partial longitudinal sectional view of a locomotive, illustrating another modified form of my invention. Fig. 7 is a vertical sectional view taken on the line 7—7 of Fig. 6, looking in the direction of the arrow.

In the exemplification of my invention, as illustrated in Figs. 1, 2, and 3 of the drawings, 8 represents a suitable driving means, such as a steam turbine, steam engine, or electric motor, which may be of any of the well known types, whereby the draft inducing means is operated. The driving means 8, shown in Fig. 2, preferably consists of a steam turbine which is directly connected to a suitable blower or fan 9 of the single suction type.

The front or smoke-box end of the locomotive is divided into separate compartments by a partition 10 which is intended to be air tight. This partition 10 is provided with a suitable opening arranged at the desired place, which registers with the suction end of the blower or fan 9. The blower or fan 9 communicates with the smoke-stack 11 by means of a delivery tube 12, whereby the gases of combustion are ejected from the locomotive. The delivery tube 12 is so secured in the base or flare 11a of the smoke stack as to provide an intervening space, as clearly shown in Fig. 2, which permits of circulation about the delivery end of tube 12. The front end or head of the locomotive may be provided with a suitable number of air inlets or ventilating openings 13 as clearly shown in Fig. 3, thus permitting circulation of fresh air which is taken in through the openings 13 and ejected through the stack 11, induced by the ejector action of the blower or fan 9 through its delivery tube 12. By securing a circulation of fresh air through the front end of the locomotive, the temperature therein will be kept at a comparative low degree and dust and dirt will be prevented from settling into the bearings of the driving means or steam turbine 8 and the blower or fan 9, thus resulting in and assisting the proper operation of this part of my invention.

The driving means 8, which is shown as preferably consisting of a steam turbine, may be of a well known construction, and is driven by steam conducted thereto from the boiler of the locomotive. In the construction shown, the live steam is delivered to the driving means 8 by means of steam conduit or pipe 14, see Figs. 1, 2, and 3; the steam pipe 14 extends through the side of the boiler-shell, as clearly shown in Fig. 3, leads rearwardly to the cab 15 of the locomotive and connects with the steam fountain 16, see Fig. 1. The live steam conduit or pipe 14 is provided with a suitable valve 17 in the cab of the locomotive so that operation of the draft inducing means may be controlled from the cab of the locomotive by means of the throttling valve 17; the valve 17 controls the supply of steam to the driving means or steam turbine 8 which drives the draft inducing means or fan 9. The exhaust steam from the driving means or turbine 8 may be discharged into the atmosphere through any suitable conduit; in the exemplification, I show the exhaust steam conveyed by the pipe 18 into the delivery tube 12 of the blower or fan, see Figs. 2 and 3.

As an auxiliary draft inducing means or blower, I show the locomotive illustrated in Figs. 1, 2, and 3, provided with a blower pipe 19 communicating with delivery tube 12 at the forward end and extending rearwardly to the exterior of the boiler-shell into the cab of the engine and into communication with the steam fountain 16. The pipe 19 is provided with a suitable valve in the cab, as at 20, whereby the passage of steam therethrough may be controlled; the blower pipe 19 being especially intended for use when the locomotive is being fired or when it is inoperative as when standing on a siding, etc.

The exhaust steam from the locomotive, or rather from the steam chests 21, is delivered into the branched or ramified exhaust pipe 22, which is located to the exterior of the boiler shell as clearly shown, see Fig. 3. The exhaust steam, therefore, will be delivered into the atmosphere without passing through the smoke-box or front end of the boiler. The exhaust pipe 22, if desired, may be provided with a muffler as indicated at 23, see Figs. 2 and 3, whereby the noise of the exhaust may be reduced. It is apparent from the construction shown and described, that the exhaust steam from the steam chests of the cylinders is delivered into the atmosphere in such a manner that the back pressure usually encountered while the steam is exhausted into the front end of the locomotive, will be reduced or practically eliminated.

In the compartment intermediate of the partition 10 and the front flue sheet at the front ends of the fire flues, I provide a baffle plate 24. This baffle plate is preferably secured at its upper end in any convenient manner to the boiler-shell and extends in the diagonal or slanting manner clearly shown in Fig. 2, with the lower end thereof somewhat removed from or terminating above the lower part of the boiler-shell as clearly shown, so as to provide a passage beneath the baffle plate 24; it being understood of course, that the baffle plate 24 extends from side to side of the boiler-shell so that communication between opposite sides thereof must be had at a point beneath the baffle member or plate 24, except when the mechanism now to be described is operated whereby communication may be established above the lower end of the baffle member. I provide the baffle plate or member 24 with a series of shutters or pivoted portions 25, extending transversely of the locomotive. The shutters 25 are pivotally secured at the ends and preferably at points coincident with their longitudinal axes, as more clearly shown in Fig. 5, whereby an opening may be produced of a width almost equal to the interior diameter of the boiler-shell and at points in line with the forward ends of a considerable portion of the fire-flues of the boiler. The different shutters 25 are provided with short arms 26 firmly secured thereto, while the other ends of these arms are pivotally connected to a connecting link 27. One end of the rod or pintle of one of the shutters, for example the intermediate shutter, is arranged to extend though to the outside of the boiler-shell, as more clearly shown at 25a, see Fig. 5, where it is provided with a rocker arm 28, see Fig. 3, to which is connected a link or rod 29 which latter extends rearward to the cab of the locomotive where it is provided with a lever as at 30, see Fig. 1, whereby the shutters in the baffle member may be operated by the engine man when desired. By providing the baffle plate 24 with the shutters just described, an adjustable baffle is obtained whereby the draft of the locomotive may be regulated and equalized so that an even fire on the grates of the fire box may be maintained. This improved mechanism may or may not be used on locomotives burning both coal and oil, being preferably employed, however, on all coal burning locomotives.

At a point beneath the baffle plate 24, the smoke box is shown provided with the forwardly and upwardly curved filling as at 31, composed of any suitable material such as concrete, cement, fire brick, and the like; the object being to produce a smoke box as nearly self-cleaning as possible, so that cinders and the like which may pass through the fire flues and drop to the bottom of the smoke box will be drawn outward by the fan or blower and forced through the stack of the locomotive.

In the exemplification of my invention, as shown in Figs. 1, 2, and 3, the boiler portion of the locomotive is rigid and the engine frame articulated; the steam exhaust pipe being rigidly secured to the locomotive or engine frame and, therefore, swings independently of the boiler. By reason of this construction, the radial and expansion joints commonly employed on all the Mallet locomotives are entirely eliminated and the very serious objection heretofore encountered through the escape of steam from the joints employed,—which at times more or less interferes with the engineer's vision,—is overcome.

In order that access may be easily had to the front end of the boiler for inspection of the flues, etc., a man-hole 32 may be provided in the side of the shell and preferably in the rear compartment of the smoke-box.

In Figs. 4 and 5, I illustrate my improvements applied to a common type or construction of a simple coal burning locomotive wherein the steam chests are provided with inside admission valves. In the modification illustrated in these figures, the locomotive is provided with external live steam pipe 33 and external exhaust steam pipe 34. The steam pipe 33 is shown located on top of the boiler-shell and is branched as shown so as to extend to the steam chests of the cylinders on opposite sides of the locomotive. The exhaust pipes 34 are preferably curved upward about the front end of the locomotive and terminate in a single discharge end or outlet as clearly shown in Fig. 5; and the discharge end may be supported or braced by the band or yoke 35 which also extends about or is secured to the smoke stack of the engine. By employing the exhaust steam pipe 34 as shown and described, the simplest form of unrestricted passage for the exhaust steam to the atmosphere is presented; and the steam will be exhausted at a point where it will not interfere with the engineer's vision. This construction also eliminates the circuitous passage necessary in the cylinder casting in common use, thus resulting in a much simpler and less expensive as well as stronger cylinder casting by reason of my improvements. With the exception of the steam conduits and the type of locomotive illustrated, the construction of the other features of my invention, namely the driving means or steam turbine, the fan or blower, the air tight partition, and the diaphragm or baffle member, is similar to those shown and described in connection with the construction illustrated in Figs. 1, 2, and 3, and the functions and operation of the respective parts are similar to those shown in Figs. 1, 2, and 3. These elements or parts are therefore identified by similar reference characters.

In Figs. 6 and 7, my invention is modified to illustrate its adaptation to a simple oil burning locomotive, provided with outside admission valves. In general respects, the application of the invention is similar to the former constructions shown and described with the exception that the location of the draft inducing means or blower is somewhat altered, and the baffle member or plate is eliminated. In the application of my invention to an oil burning locomotive where a smaller amount of cinders and ash is encountered, the baffle member or plate 24, shown in the previous figures, may be omitted if desired, as the central draft resulting from the construction shown, will give the desired result of an even fire; furthermore, as there are no sparks to be broken up in an oil burning locomotive, which is one of the functions of the baffle plate, the baffle member is not needed. In this modification, shown in Figs. 6 and 7, the air tight partition 10$^a$ is secured within the smoke box of the locomotive in the same manner as the air tight partition 10 is secured in the constructions shown in the preceding figures, except that in its application to this type of an oil burning locomotive, the air tight partition 10$^a$ is provided with a central opening which communicates with the fan or blower 9$^a$. In this construction, the fan or blower, as well as the driving means or steam turbine 8$^a$, are placed in a central position in the smoke box, as clearly shown, the driving means or turbine, as is the case in the constructions previously illustrated, is mounted on a suitable platform or bridge arranged in any suitable manner within the smoke box or chamber, as shown. The turbine 8$^a$ is supplied with steam from the boiler by means of live steam pipe 14ª and the exhaust from the turbine passes out through tube 18ª, which latter communicates with the delivery tube 12ª of the fan or blower in a similar manner to that illustrated in the preceding figures. The delivery tube 12ª of the fan or blower enters the base or flare 11ᵇ of the stack 11 so as to provide the intermediate space or passage shown in the other constructions and previously referred to. In this construction, I show the locomotive provided with an external throttle 36, see Fig. 6, which may be similar in construction to a type of throttle at present in use and which is in accord with the general principle of my invention of providing external steam pipe connections. The external throttle 36 may be centrally located beneath the boiler, as shown, especially where the locomotive is provided with a superheater so that superheated or dry steam passes through the throttle. The throttle may be connected with the steam chests of the respective cylinders on opposite sides of the locomotive, as illustrated in Fig. 7. The exhaust steam passages from the cylinders which are shown as of the inside exhaust type, enable the exhaust steam pipes or passages 37, which are located to the exterior of the boiler shell as in the previous constructions,—to be so connected to the steam chests as to be in alinement with the smoke stack 11. This permits them to be brought upward and carried into or discharge into the smoke stack, as illustrated, without, however, interfering with or impairing the exhaust of the fan or blower and without creating any additional back pressure on the exhaust steam.

With my invention, where the steam conveying means or pipes are all located outside of the boiler-shell, cylinder castings provided with external steam connections may be employed for conveying steam to and from the steam chests of the cylinders, thus resulting in much simpler cylinder castings than those heretofore employed, wherein a circuitous route for the steam through the castings leading to and from the smoke-box was necessary.

I have shown and described my invention in connection with various types of locomotives; it being readily understood that the invention is equally adapted for general service on any class of locomotive. My invention results in the production of an inexpensive, economical and practicable means for mechanically inducing draft and in greater efficiency by reason of the reduction or substantial elimination of back pressure on the exhaust steam from the steam chests of the cylinders. It will be understood, however, that the invention may be modified in certain details without, however, departing from the spirit of my invention, and I do not wish to be understood, therefore, as limiting myself to the exact constructions shown and described.

What I claim is:—

1. In a locomotive provided with a smoke box or chamber located within the boiler shell forward of the fire flues of the boiler and provided with an exterior smoke stack, a partition or wall whereby said smoke box is divided into separate chambers, said partition being provided with an opening therethrough, draft inducing mechanism communicating with the opening in said partition and located in alinement with the smoke stack, driving means located forward of said mechanism and directly connected thereto, and draft controlling means located intermediate of said partition and the forward ends of the fire flues of the boiler.

2. In a locomotive provided with a smoke box or chamber forward of the fire flues of the boiler and having a smoke stack communicating with said chamber, the combination of means located in the smoke box in alinement with the smoke stack whereby draft is mechanically induced in the locomotive, baffle means located intermediate of the draft inducing means and the forward ends of the fire flues of the boiler whereby the path of the products of combustion is determined, said last mentioned means being provided with adjustable portions operable from the cab of the locomotive whereby the draft may be regulated and the path of the products of combustion altered, with means located outside of the boiler shell of the locomotive for conveying the steam to and from the steam chests of the cylinder.

3. In a locomotive provided with a smoke box or chamber forward of the front ends of the fire flues of the boiler and having an exterior smoke stack, the combination of means located in the smoke box in alinement with the smoke stack whereby draft in the locomotive is mechanically induced, with means located outside of the boiler shell and connected with the steam chests of the cylinders and arranged to receive the exhaust steam therefrom, said means being adapted to have movement independent of the movement of the boiler of the locomotive.

4. In a locomotive provided with a smoke box forward of the fire flues of the boiler, the combination of means located in the smoke box whereby draft is mechanically induced in the fire flues of the boiler, and means whereby the smoke box and said draft inducing means are air cooled.

5. A locomotive provided with a smoke box forward of the fire flues of the boiler, said smoke box being provided with forwardly presented air inlets, means located in the smoke box whereby draft is mechanically induced in the locomotive, mechanism directly connected to said means whereby the latter is operated, and means whereby the steam from the cylinders is exhausted directly into the atmosphere.

6. A locomotive provided with cylinder castings having direct steam passages, steam pipes located exterior of the boiler shell and communicating with said passages for exhausting the steam into the atmosphere, means located in said exhaust pipes whereby the noise of exhaust is reduced, and means for mechanically inducing draft in the locomotive.

7. In a locomotive provided with a smoke-box or chamber located forward of the fire flues of the boiler, a smoke-stack communicating with said smoke-box or chamber, one wall of said smoke-box being provided with an opening extending therethrough, draft inducing mechanism connected with the opening in said wall and communicating with the smoke-stack, driving means directly connected with said mechanism and operable from the cab of the locomotive, a baffle member located intermediate of said partition or wall and the forward ends of the fire flues of the boiler whereby the path of the gases of combustion is determined, and means located exterior of the boiler shell and communicating with the cylinders for receiving the exhaust steam therefrom.

8. In a locomotive provided with a smoke-box or chamber divided into two compartments forward of the front ends of the fire-flues of the boiler and having an exterior smoke-stack, the combination of steam operated means located in the forward compartment, communicating with the rearward compartment of the chamber and in alinement with the smoke-stack whereby draft through the fire flues of the boiler is mechanically induced, the relation of the delivery end of said means to the stack being such that a circulation of air in the forward compartment of said chamber is induced, means, operable from the cab of the engine, whereby the flow of steam to said first mentioned means may be controlled, with means, located exterior of and independent of the boiler-shell, connected with the valve-chambers of the cylinders and adapted to receive the exhaust steam therefrom, said means being arranged to move with the engine-frame of the locomotive, the last mentioned means being so arranged as to reduce the noise of the exhaust steam passing therethrough.

9. In a locomotive provided with a smoke-box or chamber forward of the front ends of the fire flues of the boiler, and a smoke-stack, the combination of means located in the path of the gases forward of the flues and communicating with the smoke-stack whereby draft in the flues is mechanically induced, with means directly connected with the valve-chambers of the cylinders so as to move with the engine-frame of the locomotive, independent of the boiler-shell, said means being arranged to receive the exhaust steam from the valve-chambers of the cylinders to exhaust the same directly and freely into the atmosphere.

HELON B. MacFARLAND.

Witnesses:
   GEORGE HEIDMAN,
   R. E. WIGHTON.